United States Patent Office 3,078,282
Patented Feb. 19, 1963

3,078,282
ANTHRAQUINONE DYESTUFFS
Hans-Samuel Bien, Leverkusen, and Fritz Baumann, Opladen, Germany, assignors to Farbenfabriken Bayer Aktiengesellschaft, Leverkusen, Germany, a corporation of Germany
No Drawing. Filed Dec. 29, 1960, Ser. No. 79,138
Claims priority, application Germany Jan. 2, 1960
5 Claims. (Cl. 260—374)

The object of the invention are new anthraquinone dyestuffs of the formula

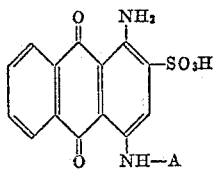 (I)

wherein A stands for an isothiocyano di- or tri-lower alkyl-phenyl residue or an isothiocyano cyclohexyl residue.

The new dyestuffs may be produced, for example, by reacting the external free amino groups present in the di- or tri-lower alkyl-phenyl or cyclohexyl substituent at the 4-standing amino group with thiophosgene, for example according to the process of German patent specification No. 606,557. The reaction with thiophosgene is preferably carried out at temperatures of 0–60° C., particularly of 0–10° C., in an aqueous medium. It is sometimes advantageous to use organic solvents such as tertiary bases or acid amides, for example pyridine, dimethylformamide or N-methylpyrrolidone, as reaction medium, whereby water may also be added, if otherwise the sulphonic acids of the starting components would dissolve with difficulty.

The new dyestuffs prove to be especially advantageous for the dyeing of wool, polyamide, and polyurethane fibres according to methods commonly used for this purpose, preferably in acid to neutral medium. Mainly blue dyeings are thus obtained having good general fastness properties, particularly a good fastness to wetting, washing, milling and light.

The dyestuffs are also suitable for the dyeing and printing of materials containing hydroxyl groups such as filaments, fibres and fabrics from native or regenerated cellulose. For this purpose, an acid-binding agent and dyestuffs of the Formula I are applied in optional sequence to the materials to be dyed and are then subjected to a heat treatment.

For dyeing cotton and regenerated cellulose, the dyestuffs are preferably used in an aqueous solution which is treated with alkaline substances such as alkali metal hydroxides, alkali metal carbonate, alkali metal borates and perborates, alkali metal phosphates, alkali metal acetates, or with compounds convertible into alkaline substances such as alkali metal bicarbonate, or with mixtures of such compounds, particularly buffer mixtures. Further assistants may be added to the solution provided they do not react with the dyestuffs in an undesirable manner. Such additives are for example inorganic salts such as alkali metal chlorides or sulphates, furthermore surface-active substances such as alkyl sulphonates, or substances preventing the migration of the dyestuff, or dyeing auxiliaries, or acid amides such as dimethyl formamide, acetamide, caprolactam, N-methylpyrrolidone, or inert thickeners such as oil-in-water emulsions, methyl cellulose, tragacanth, alginate.

The solutions or pastes thus prepared are applied to the dyeing material, for example by padding on the foulard or by means of a dyebath, preferably at room temperature, and squeezed off. For fixation of the dyestuffs, the material thus impregnated is heated, if desired after intermediate drying, for some time to elevate temperatures, preferably within the range of 40–160° C. The heating may be carried out in the hot flue, in a steaming apparatus, on heated rollers or by placing the material into heated concentrated salt baths, using these methods singly or also consecutively in any sequence.

If a padding or dyeing liquor is used without alkali or acid-binding agent, the dry material is subsequently passed through an alkaline solution to which inorganic salts such as common salt or Glauber's salt have been added. Alkali metal or alkaline earth metal hydroxides are used with advantage as alkalies. The addition of salt prevents the migration of the dyestuff from the fibre.

The dyestuffs may also initially be applied like substantive cotton dyestuffs. For this purpose the dyeing material is placed into the dyestuff solution, salt is added and the bath heated to 80–90° C. After the addition of an alkaline agent such as $Na_3PO_4$, $Na_2CO_3$, $K_2CO_3$, dyeing is continued at 80–90° C. for another hour and the material then boiled with soap.

According to another modification, the fibre material may initially be treated with an acid-binding or alkaline agent, the dyestuff solution or paste then applied and, finally, the material subjected to a heat treatment for fixation of the dyestuffs.

For printing cotton or regenerated cellulose a printing paste is prepared from a solution of the dyestuffs, a wetting or thickening agent such as sodium alginate, and an alkaline compound or a compound splitting off alkali upon heating such as $Na_2CO_3$, $Na_3PO_4$, $K_2CO_3$, potassium acetate or $NaCO_3$ or $KHCO_3$.

It is advantageous in some cases to subject the dyeings and prints to subsequent treatment in a neutral or alkaline medium, usually boiling with soap. Unfixed dyestuff residues are thus removed from the fibre. The prints and dyeings obtainable on cellulose material are distinguished by good fastness to wet processing, washing, milling and to light.

The following examples are given for the purpose of illustrating the invention without, however, limiting it thereto.

Example 1

9.6 g. of the reaction product from 4-bromo-1-aminoanthraquinone-2-sulphonic acid and 1,3-diamino-2-,4-diethyl-6-methylbenzene are dissolved in a solution of 80 ml. of water and 2 g. of sodium carbonate and treated with 20 ml. of N-methylpyrrolidone.

2.3 ml. of thiophosgene are added dropwise at 0–5° C. The precipitated product is filtered off with suction, slurried with water, again filtered off with suction, washed with water until the discharge is pale blue. The dyestuff corresponds to the formula

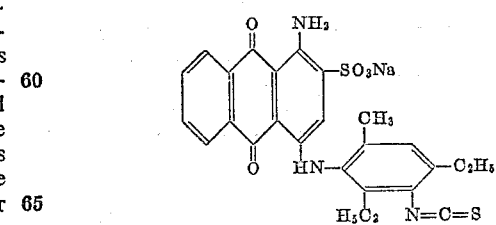

and upon dyeing according to conventional methods draws on wool in clear neutral blue shades which are distinguished by very good fastness to washing.

If the reaction product from 4-bromo-1-aminoanthraquinone-2-sulfonic acid and 1,3 diamino-2,4,6-triethylbenzene is used as starting material in this example a dyestuff is obtained which possesses similar dyeing properties.

*Example 2*

12 g. of the reaction product from 1-amino-4-bromo-anthraquinone-2-sulphonic acid and hexahydro-paraphenylene-diamine are dissolved in 300 ml. of water, 100 ml. of N-methylpyrrolidone and 5 ml. of sodium hydroxide 38° Bé., the solution is clarified and 4.6 ml. of thiophosgene are added at 0–5° C. The pH is kept at 7 by the addition of sodium carbonate. The reaction product crystallises out during the reaction. When the reaction is complete the product is filtered off with suction, washed with a 2% sodium chloride solution and dried on clay. This dyestuff corresponding in the form of the free acid to the formula

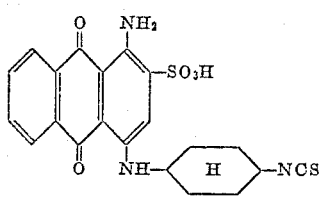

yields on wool brilliant reddish blue dyeings very fast to wetting and having a good fastness to light.

*Example 3*

Into a solution of 0.1 g. of the dyestuff obtainable according to Example 2, 398.9 ml. of water and 1 g. of calcinated Glauber's salt, a 10 g. wool skein is introduced at 20–30° C., the bath heated to boiling temperature within 20 minutes and the dyeing carried out at this temperature for an hour. The dyed material is then rinsed cold and dried. A brilliant reddish blue dyeing of very good fastness to wetting is thus obtained.

*Example 4*

A printing paste is prepared from the following ingredients: 2 g. of the dyestuff having the formula

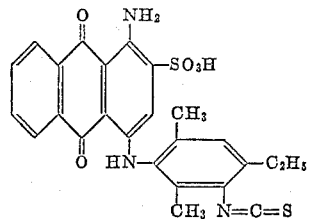

39.5 ml. of water
3 g. of potassium acetate
10 g. of caprolactam
55 g. of alginate thickening
(120 g. of dry substance per kilogram)

Calico is printed with this printing paste, then dried at 60–80° C. and subsequently fixed by steaming at about 105° C. After rinsing and boiling with soap, a clear blue print of very good fastness to wetting is obtained.

*Example 5*

Into a solution of 0.1 g. of the dyestuff obtainable according to Example 1, 1 g. of calcinated Glauber salt, 0.3 g. of 30% acetic acid and 398.6 ml. of water, a 10 g. wool skein is introduced at 20–30° C. The temperature is raised to boiling point within 20 minutes and the dyebath then kept at boiling temperature for ¾ hour. The material is rinsed cold and dried. A clear blue dyeing of good fastness to wetting is thus obtained.

We claim:

1. An anthraquinone dyestuff of the formula

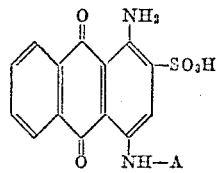

wherein A stands for a member selected from the group consisting of an isothiocyano substituted triethylphenyl radical, an isothiocyano substituted diethyl-monomethyl-phenyl radical, an isothiocyano substituted dimethyl-monoethyl-phenyl radical, the substituted phenyl radicals having the isothiocyano group in meta-position to the —NH— group, and an isothiocyano cyclohexyl group bearing the isothiocyano group in para-position to the —NH— group.

2. The dyestuff of the formula

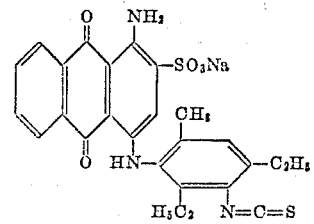

3. The dyestuff of the formula

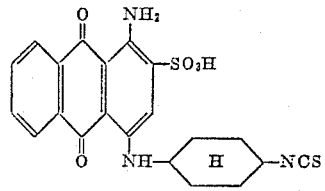

4. The dyestuff of the formula

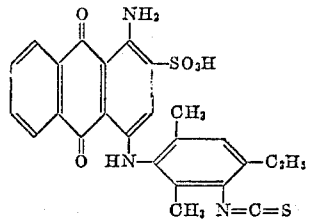

5. The dyestuff of the formula

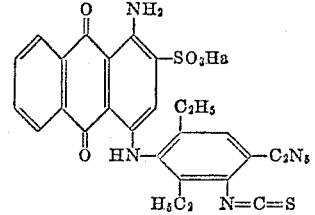

References Cited in the file of this patent

UNITED STATES PATENTS 1,840,420     Weinand _____ Jan. 12, 1932
2,427,527     Gutzwiller _____ Sept. 16, 1947